Feb. 19, 1952

C. W. MOSS ET AL 2,586,371

ELECTRIC PROTECTION FOR LOOMS

Filed Oct. 12, 1949

INVENTORS
CHARLES W. MOSS
WILLIAM A. BLANCHARD

Chas. T. Hawley

ATTORNEY.

INVENTORS
CHARLES W. MOSS.
WILLIAM A. BLANCHARD.

*Chas. P. Hawley*
ATTORNEY

Feb. 19, 1952 C. W. MOSS ET AL 2,586,371
ELECTRIC PROTECTION FOR LOOMS
Filed Oct. 12, 1949 3 Sheets-Sheet 3

INVENTORS
CHARLES W. MOSS
WILLIAM A. BLANCHARD.

Chas. T. Hawley
ATTORNEY

Patented Feb. 19, 1952

2,586,371

UNITED STATES PATENT OFFICE 2,586,371

ELECTRIC PROTECTION FOR LOOMS

Charles W. Moss, Canton, and William A. Blanchard, Millbury, Mass., assignors to Crompton & Knowles Loom Works, Worcester, Mass., a corporation of Massachusetts Application October 12, 1949, Serial No. 121,002

24 Claims. (Cl. 139—341)

This invention relates to improvements in protection devices for looms and it is the general object of the invention to provide simple electric controls which will effect prompt loom stoppage upon failure of the shuttle to arrive at a given point along the lay between the shuttle boxes at a given time in the loom cycle.

The protection mechanism ordinarily employed on looms includes a protector rod on the lay having daggers and protector fingers secured thereto. The fingers cooperate with shuttle binders and the daggers are normally in stopping position. When the shuttle reaches a shuttle box it moves the corresponding binder and finger and thereby rocks the protector rod to move the dagger to non-stopping position. If the shuttle fails to reach its shuttle box the daggers engage bunters on the loom frame. The shuttle binder must serve not only its primary function of checking the shuttle, but must also move sufficiently to rock the protector rod.

Former protector mechanisms require the shuttle actually to arrive at the shuttle box in order to permit continued operation of the loom. Because of the short time remaining between the normal time for the shuttle to enter the shuttle box and the time at which the loom must be stopped to prevent a warp smash, protector mechanisms of previous construction have operated very abruptly to stop the loom in a manner which strains the lay and all parts of the loom connected to it. The shock incident to protection is a factor which limits the speed of loom operation. When a loom is operated at increased speed the lay carried daggers strike the stopping mechanism with greater force and there is increased likelihood of breakage.

One purpose of this invention is to permit increased loom speeds without increasing the force required to stop the loom by allowing the stopping forces to act through increased time.

If the shuttle is running properly it is not necessary to wait until it actually arrives at a shuttle box in order to give indication that it will arrive on time. It is an important object of the present invention to cause the shuttle when running properly to give an indication prior to its arrival at the shuttle box that it is on time and thereby permit the loom to continue running. If the shuttle is late, however, this fact will be determined by the protection mechanism to be set forth in detail hereinafter and stoppage of the loom can be initiated at a time in the loom cycle earlier than that at which the shuttle would normally enter the shuttle box.

It is a further object of the present invention to provide an electric switch operator or controller located along the lay between the shuttle boxes in position to be moved by the shuttle for the purpose of changing the electric condition of a detecting switch. If this change in electric condition occurs at the proper time in the loom cycle the loom will be permitted to continue running, but if the change in the switch occurs too late electric means controlled by the switch will act to stop the loom. The switch operator may take the form of a plunger movable vertically in the lay under the path of the shuttle to be depressed partly at least by the weight of the shuttle while the latter is in flight between the shuttle boxes, but the invention is not limited to this type of operator.

In the following description two different conditions of the shuttle controlled switch are shown in connection with three forms of the invention in two of which the switch operator or operators are located along the lay at points intermediate the selvage warps, while in the third form the operators are between the warp shed and the shuttle boxes. When the operator is under the warp shed it must be able to withstand any downward force exerted by the warp threads of the bottom shed which engage it, but be able to yield to the shuttle. When thus located the switch operator is acted upon by three forces, one of which tends to hold the operator in the path of the shuttle, another of which is the downward force exerted by the warp threads touching the operator, and the third of which is the force exerted on the operator by the shuttle. The first of these three forces is intermediate the other two forces. When the switch operator is located between the warp shed and the shuttle boxes, however, the second of these forces will be absent.

In the description to follow the detecting switch is moved or controlled by an operator of specific form, but certain features of the invention are not limited to this particular type of operator, and it will be sufficient for the purposes of such features if the operator is of any form which will enable the shuttle to effect a change in the detecting switch.

With these and other objects in view which will appear as the description proceeds, the invention resides in the combination and arrangement of parts hereinafter described and set forth.

In the accompanying drawings.

Figures 1, 2, 3, 4, 5, 15:
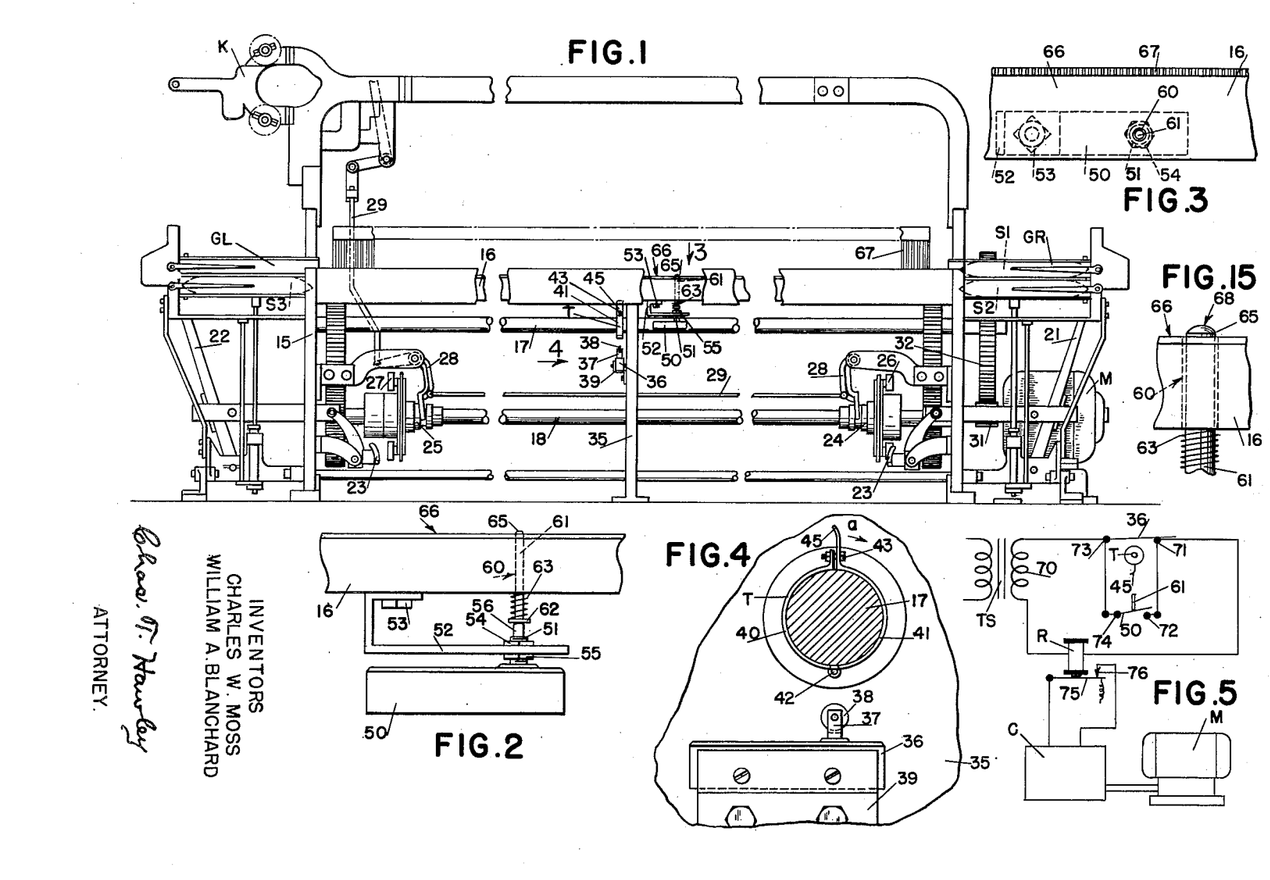
Fig. 1 is a front elevation, parts being broken away, of a loom, showing the preferred form of the invention wherein the shuttle closes a single detecting switch when near the longitudinal center of the lay during a single detecting period for each flight of the shuttle.
Fig. 2 is an enlarged front elevation showing the detector switch and its operating plunger, the latter being in normal position.
Fig. 3 is an enlarged detail fragmentary plan looking in the direction of arrow 3, Fig. 1.
Fig. 4 is an enlarged side elevation of the timing switch and operating mechanism therefor looking in the direction of arrow 4, Fig. 1, the top shaft of the loom being in section.
Fig. 5 is a diagrammatic view showing the electric circuit used in the preferred form of the invention.
Fig. 15 shows a switch operated or plunger the upper end of which is convex.

Referring particularly to Fig. 1, the loom frame 15 supports a lay 16 which swings backwardly and forwardly during loom operation. The loom has a top shaft 17 which makes a complete rotation each pick of the loom, and has a bottom shaft 18 which rotates once every second pick of the loom. The lay is provided with right and left shuttle box gangs GR and GL, respectively, which shift relatively to the lay by known mechanism not shown herein but controlled from a head mechanism K.

Right and left picker sticks 21 and 22, respectively, are operated by picking mechanisms each including a cam 23. Sleeves 24 and 25 slidable on but rotating with the bottom shaft are provided with picking rolls 26 and 27, respectively.

The sleeves are operatively connected to levers 28 which in turn are connected by rods 29 to the mechanism K. The sleeves are shifted with respect to their picking cams so that only one shuttle can be picked at a time, but the sleeves can be slid along the bottom shaft by the mechanism K to produce any desired order of picking of the shuttles S1, S2 and S3.

The loom set forth in Fig. 1 is of the pick and pick type, but the invention is not limited in its use to such a loom, and the shuttle boxes and picking mechanism are shown merely for illustrative purposes. One or another of the three shuttles will be picked across the loom once for each revolution of the top shaft, and any of the shuttles may, if desired, remain active for several picks, or after being in action for one pick, can become inactive and be followed by another shuttle on the next pick.

The loom is driven by an electric motor M which is connected in usual manner to turn the shafts 17 and 18. Parts of these connections are indicated by a motor pinion 31 and a gear 32 on the top shaft. The loom operates in such manner that the lay will be reciprocated and other parts of loom set in motion whenever the motor M is running, but whenever the motor stops the loom stops with it. A motor control means or panel C, Fig. 5, is provided to stop the motor in a very short time in the event that loom stoppage is indicated by the protecting mechanism.

The matter thus far described sets forth a particular type of loom to which the invention can be applied and except as noted hereinafter, forms no part of the present invention.

In carrying into effect the forms of the invention employing a normally open detecting switch or switches, parallel timing and detecting circuits are provided for a control relay R. Referring particularly to Figs. 1 to 5, which show the preferred form of the invention wherein a single detecting zone is provided along the lay, a center brace 35 of the loom supports a timer switch 36 having a plunger 37 on the upper end of which is rotatably mounted on a roller 38. The switch is held in fixed position by a bracket 39 bolted to the center brace 35, see Figs. 1 and 4.

Secured to the top shaft 17 above switch 36 is a switch trip or opener mechanism T which, as shown more particularly in Fig. 4, includes two clamp parts 40 and 41 hinged to each other at 42 and held by a bolt 43 in clamped angularly adjusted position on the shaft 17. A trip finger 45 extends outwardly from shaft 17 from one of the clamp parts and moves in the direction of arrow a, Fig. 4, to depress the plunger 37 once for each pick of the loom, or for each rotation of top shaft 17. Switch 36 is normally closed and plunger 37 raised, but when the trip finger 45 engages the roll 38 it momentarily opens the loom operated timer switch 36 for a brief interval.

A shuttle controlled detector switch 50, see Fig. 2, has a screw threaded stem 51 which passes through a support 52 secured as at 53 to the under side of the lay 16. Top and bottom nuts 54 and 55 on stem 51 permit vertical adjustment of the switch 50 relatively to the support 52 and lay. The switch has an upwardly extending plunger 56 which is normally in raised position, and the switch 50 is normally open.

The lay is provided with a vertically extending hole or bore 60 and a switch operator or controller, shown here as a rod 61, has a head 62 at the bottom thereof and is slidably mounted in the bore. A weak compression spring 63 interposed between the bottom of the lay and the head tends to hold the operator 61 down against the plunger 56, the latter normally supporting the operator rod 61. The force exerted by the spring 63 is very small and is not sufficient to depress plunger 56 or close detector switch 50. It will not be necessary in all instances to use the spring 63, but it is desirable to keep the rod 61 in low position.

The upper end 65 of rod 61 extends slightly above the race plate 66 of the lay and is located forward of the reed 67, see Fig. 3. This upper end of the plunger projects slightly into the path traversed by any shuttle in action and will be depressed by a shuttle passing over it. The top of the plunger 61 can be curved as at 68, see Fig. 15.

During normal operation of the loom one or the other of the picker sticks will pick a shuttle and as the latter traverses its path along the lay it engages and depresses the switch operating means 61 to push the plunger 56 down and close the normally open detector switch 50. With a single switch operator located at the center of the loom as shown in Fig. 1 this depression of the operator will ordinarily occur when the lay is at or very close to its back center position.

The trip finger 45 is so located on the shaft 17 that it will open switch 36 at the time switch 50 is closed by the shuttle, provided the latter is running on time. The circuit for this control is shown in Fig. 5. The relay R is connected to one side of secondary 70 of transformer TS. The other side of the relay is connected to pole 71 of switch 36 and also to pole 72 of switch 50. The other side of the secondary 70 is connected to pole 73 of switch 36, and also to pole 74 of switch 50.

The two switches 36 and 50 and their respective circuits are in parallel and when either switch is closed the relay R will be maintained energized so that it will attract its armature 75 and hold it against a contact 76 in a circuit leading to the motor control mechanism C. So long as relay R is energized and armature 75 engages contact 76 the control mechanism C will be in such condition as to permit the motor M to run and cause operation of the loom, but whenever relay R is deenergized and armature 75 moves away from contact 76, controller C stops the motor and loom very promptly.

When only one switch operator or plunger 61 is used the shuttle can give an indication equal only to the length of time required for the bottom of the shuttle to pass over the plunger 61. If it be desired to enable the shuttle to have a longer period of indication, while passing through a single detecting zone, two operators or rod elements 80 and 81 similar to rod 61 will be located near the longitudinal center of the lay under the path of the shuttle and spaced apart a distance slightly less than the length of the bottom of the shuttle. These rods operate switches 82 and 83, similar to switch 50, and both are normally open and are connected in parallel.

Figure 7:
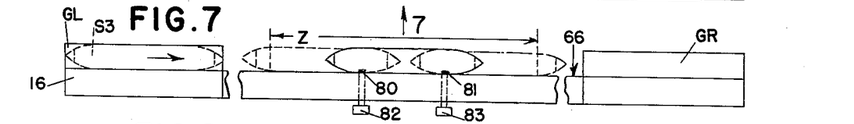
Fig. 7 is a diagrammatic view looking in the direction of arrow 7, Fig. 6.
Figure 8:
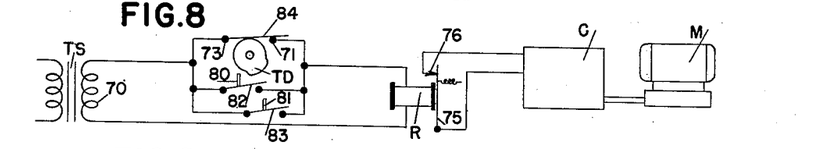
Fig. 8 is a diagrammatic view of the electric circuit used with the form of the invention shown in Fig. 6.

The wiring diagram for this variation of the preferred form of the invention is shown in Fig. 8, where a timer loom operated switch 84, similar to switch 36, is held open by cam TD for a slightly longer time or interval than switch 36 is opened by mechanism T. The rods 80 and 81 will be depressed progressively as the shuttle passes over them, the first rod to be depressed remaining down until the second rod is depressed. As shown in Fig. 7, the shuttle when in the dotted line position and traveling to the right will close switch 82 and will maintain it closed until the shuttle reaches the full line position, whereupon the switch 83 is closed while switch 82 is still closed. Switch 83 remains closed until the shuttle has moved to the dot and dash line position, Fig. 7, switch 82 having meantime opened. The switches 82 and 83 are connected electrically in parallel with switch 84, as will be apparent from Fig. 8. The general operation of the detecting circuits shown in Fig. 8 is essentially the same as that described in connection with Fig. 5.

In the preferred form of the invention indication of shuttle presence is given comparatively early in the pick, that is, when the shuttle is approximately half way across the lay. If it be desired to have the shuttle give its indication later in the pick, the arrangement shown in Fig. 9 may be employed, where the switch operator rods 85 and 86 are located under the warp shed but at spaced detecting zones adjacent to the selvage warps WS. These operators control switches 87 and 88, similar to switch 50, and the timer switch 89 will be similar to the previously described timer switch 36 except that it will be opened later in the cycle of the loom.

Figure 9:
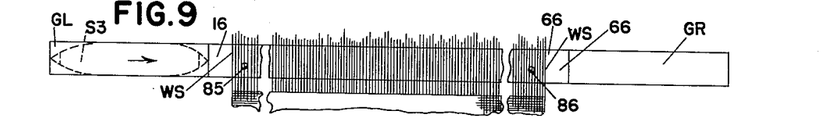
Fig. 9 is a diagrammatic plan of a lay showing the first modified form of the invention utilizing two detecting zones and wherein two plungers are located under the warp near the selvage warps.

When a shuttle is traveling from the left to the right, as indicated for instance in Fig. 9, rod 85 will be depressed early in the flight of the shuttle to close switch 87 while the timer switch 89 is closed. This closing of switch 87 will be without useful effect, but as the shuttle continues to travel across the lay it will depress rod 86 and close switch 88 as the timer switch 89 opens, provided the shuttle is running on time. The relay R will therefore remain energized.

Figure 10:
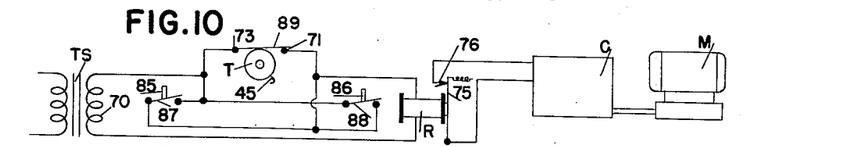
Fig. 10 is a diagram showing the electric circuit used with the first modified form of the invention.

On the return flight of the shuttle in the opposite direction switch 88 will be closed without useful effect, but closure of switch 87 will occur when switch 89 is open, provided the shuttle is on time. Rods 85 and 86 in this form of the invention are spaced considerably farther apart than the operators shown in Fig. 6, and there is no overlapping of the period of closure of the switches 87 and 88. Fig. 10 shows the electric circuit means for switches 87, 88 and 89.

Figure 11:
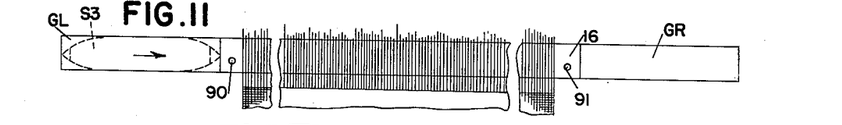
Fig. 11 is a diagrammatic plan showing the second modified form of the invention wherein the detecting zones are located between the warp shed and the shuttle boxes on the lay.

If it be desired to have the shuttle give indication at a still later point in its flight the arrangement shown in Fig. 11 may be employed, wherein the switch operator rods 90 and 91, similar to rods 85 and 86, are located along the lay under the shuttle path but in detecting zones outside of the space occupied by the warp shed. These plungers will operate switches similar to switches 87 and 88 and the timer switch can be set a little later than is the case in the first modified form of the invention. Otherwise this second modified form of the invention will operate in a manner similar to the first modified form. In order to take full advantage of the form of the invention shown in Fig. 11 it is desirable that the operators be so located that they will be depressed by the leading end of the shuttle while the trailing end is still in the warp shed.

In the form shown in Fig. 7 the shuttle can depress an operator for the detecting switch means wherever it may be in the detecting zone Z. This zone will be longer than twice the length of the bottom of the shuttle, but where a single operator is used, as in Figs. 5, 9 and 11 for each zone, the latter will be shorter and equal to twice the length of the shuttle bottom. The detecting zone will be a length along the lay in which the shuttle can effect continuous closure of one or more detecting switches.

Figure 13:
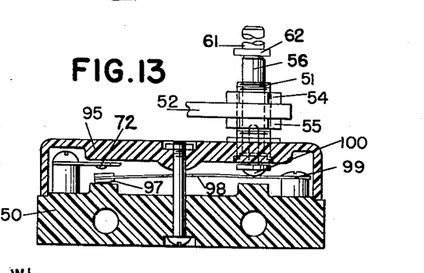
Fig. 13 is a vertical section through the detector switch usable with any of the foregoing forms of the invention, showing the switch in its normal open position, the operating plunger and shuttle being shown diagrammatically.

When the plungers which operate the detecting or indicating switches are under the warp shed it is necessary that they be mounted resiliently in such manner that they will not be depressed by the downward force exerted by the bottom shed but can be pushed down by the shuttle. The detector switch used for indicating shuttle presence at a given point along the lay may be as shown for instance in Fig. 13, although the switch shown therein is only an example, and the invention is not necessarily limited to such a switch. The details of switch 50 will be described with the understanding that the other detecting switches may be of similar construction.

Figure 14:
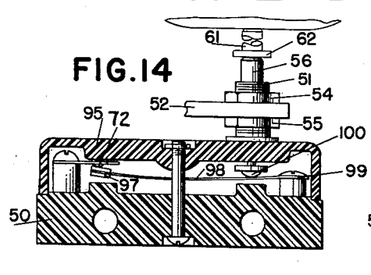
Fig. 14 is a view similar to Fig. 13, but showing the switch closed.

Switch 50 includes a housing 95 having mounted therein the previously described stationary electric contact 72 for engagement with a movable electric contact 97. The latter is mounted on an electric current conducting spring 98 the right end of which is held fixed with respect to the housing 95, as at the pole 74. The plunger 56 has on the lower end thereof a head 100 which normally rests on spring 98 and is held in raised position by it. Spring 98 is so formed that when the head 100 is depressed the contact 97 will snap up from the low position shown in Fig. 13 to the high position shown in Fig. 14, thereby establishing electric engagement with the contact 72. The switch is maintained in this condition so long as plunger 56 is depressed, but as soon as the latter is free to rise spring 98 will return to the position shown in Fig. 13 and plunger 56 and the rod 61 will again return to their normal raised position relative to the lay.

Figure 12:
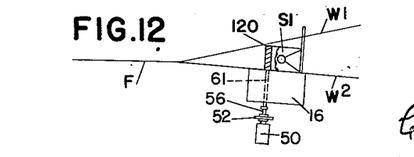
Fig. 12 is a diagram showing the relation between the warp shed, the shuttle, the plunger, and the detector switch, in the preferred and first modified form of the invention, the shuttle being partly in section.

Referring to Fig. 12, the fabric F being woven is connected to warp threads extending rearwardly in the loom and divided into upper and lower sheds W1 and W2 when the shuttle is in flight. Certain of the warp threads of shed W2 which extend over and engage the rod 61 will exert a downward force on the latter, but this force will be less than the upward force exerted by spring 98, and the switch 50 will therefore remain open even though warp threads of the bottom shed W2 are pressing down on the top of plunger 61. As the shuttle passes over rod 61 it exerts a force on the latter sufficiently strong to overpower spring 98, whereupon the previously described closure of switch 50, for instance, will ensue.

It will thus be seen that when a plunger or operator rod for the detecting switch is located under the warp shed the force exerted by the switch spring tending to hold the latter open and also support the operator is greater than the downward force exerted by the small group of warp threads which engage the top of the plunger or operator, but is less than the downward force exerted by the shuttle.

In the second modified form of the invention the operators for the switches lie outside the zone occupied by the warp shed and are therefore not subjected to the downward force of any warp threads. Under these conditions it will be sufficient if the resilient force tending to hold a detecting switch open is less than the downward force exerted by the passing shuttle without regard to whether the switch spring could or could not withstand the downward force of a small group of warp threads.

The force exerted by the shuttle is due largely to its weight. It is observed in operation that the shuttle shows little or no tendency to be deflected upwardly by the operators, and the latter have no material effect on the character of motion of the shuttle.

Figure 6:
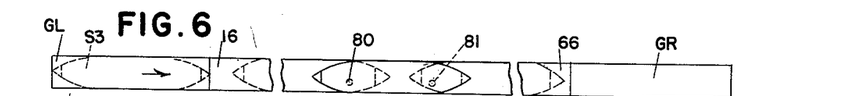
Fig. 6 is a diagrammatic plan view of a lay showing a variation of the preferred form wherein two plungers are located in a detecting zone near the longitudinal center of the lay to be depressed successively by the traveling shuttle during a single detecting period.

In the forms of the invention shown in Figs. 9 and 11 only one rod or switch controller is shown in each detecting zone, but it is to be understood that if desired two or more detector switch operators can be located at each zone in a manner described in connection with Figs. 6 to 8.

In the matter thus far described the detecting switches are normally open and are closed by the shuttle. In the form of the invention shown in Figs. 16 to 18, however, the detecting switch is normally closed and is opened by the shuttle.

Figure 16:
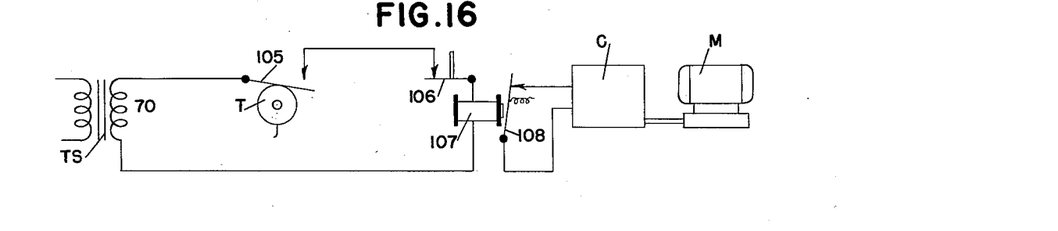
Figs. 16, 17 and 18 are diagrammatic views showing electric circuits of a modified form in which the detecting switch is normally closed, and corresponding, respectively, to Figs. 5, 8 and 10, and Figs. 19 and 20 show variations of electromagnetic devices to control the loom stopping means.

Referring particularly to Fig. 16, the timer switch 105 will be normally open and will be closed momentarily for a brief detecting interval by the cam or timer T when the shuttle is passing through a detecting zone and is depressing a detecting switch operator. The detecting switch 106 will be normally closed and relay 107 will be normally deenergized so that its armature 108 will be in the position shown in Fig. 16 to complete a circuit through the control mechanism C and enable the latter to permit continued loom operation.

In the form shown in Fig. 16 the timer switch 105 and the detecting switch 106 are in series, but the two switches will not ordinarily be closed simultaneously when the shuttle is running correctly, the switch 106 being opened by the shuttle during the time the switch 105 is temporarily closed. If, however, the shuttle should be late and switch 106 should remain closed when switch 105 is closed, the normally deenergized relay 107 will then become energized and attract its armature and break the circuit to the control mechanism C, whereupon the loom will be stopped as in the forms of the invention previously described.

Figure 17:
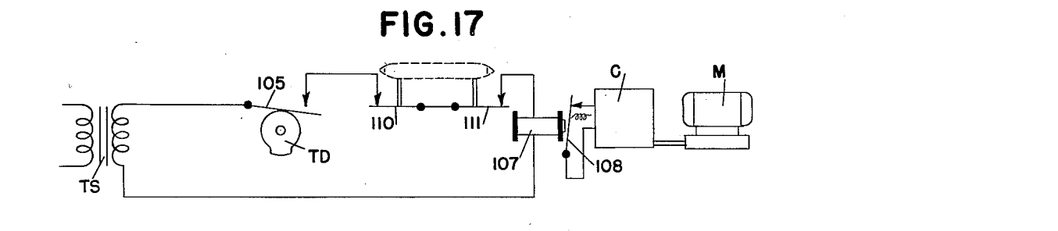

Fig. 17 shows the conditions which will exist when two normally closed detecting switches are located in a single detecting zone. The switch 105 will be the same as that described in connection with Fig. 16, but the switch closer TD will be able to hold switch 105 closed slightly longer than is the case in Fig. 16. The two detecting switches 110 and 111 will normally be in a closed position and will be in series with each other and switch 105 and relay 107. In this form of the invention the two operators will be depressed in succession as described in connection with Figs. 7 and 8, the shuttle when moving in either direction across the lay and running correctly opening first one of the switches 110 or 111 and then opening the second switch while the first switch is still open, the switch 105 being closed at this time. Failure of the shuttle to open either switch 110 or 111 during the interval that the switch 105 is closed will close the series circuit through the relay 107 and the mechanism C will act to stop the loom.

Figure 18:
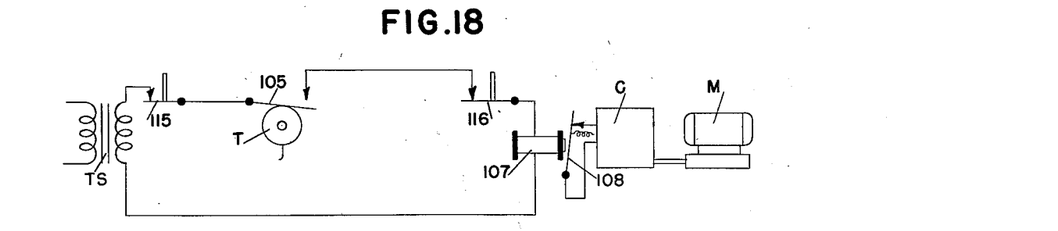

In Fig. 18, which corresponds to the circuit shown in Fig. 10, the detecting switches 115 and 116 will be located a considerable distance apart along the lay in two different zones and both switches will normally be closed. If the shuttle is running properly it will open one or the other of these detecting switches when switch 105 is closed and the series circuit including the relay will remain deenergized. If, however, the shuttle should fail to open the second of these switches which it encounters in its flight across the lay when switch 105 is closed the series circuit will be completed and relay 107 energized.

In the form of circuit shown in Fig. 8, for instance, the relay is normally energized, whereas in the form of circuit shown for instance in Fig. 16 the relay is normally deenergized, but in both instances there will be a change in the condition of energization of the relay if the shuttle fails to operate the detecting switch at the correct time in the loom cycle, and in both forms such failure will result in loom stoppage. In both forms there is a detecting switch which can be either normally open or normally closed, but is normally in one of these conditions and is moved to the other condition by the shuttle.

In the usual protector mechanism the shuttle binder is required not only to check the shuttle but also rock the protector rod, and the spring on the protector rod, acting through the protector finger, aids the shuttle checking operation. In the type of protection set forth herein there is no protector rod or finger, and a change may be necessary in the setting of the shuttle binder to compensate for the absence of protector fingers when this form of protection is used. Since the shuttle binders are not required to move protector fingers their extent of motion for shuttle checking purposes can be considerably reduced and the checking operation improved.

As a matter of practical convenience the detecting switch operator in all forms of the invention may be located below one of the vertical walls of the shuttle. In Fig. 12 the shuttle S1 is shown as having its front wall 120 over the operator rod 61. The detecting switch operator, however, need not necessarily be located with reference to the shuttle as specifically shown in Fig. 12.

Figure 19:
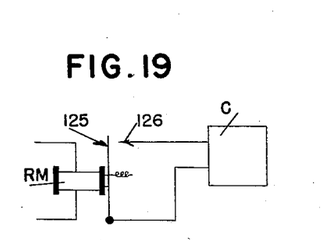
Figure 20:
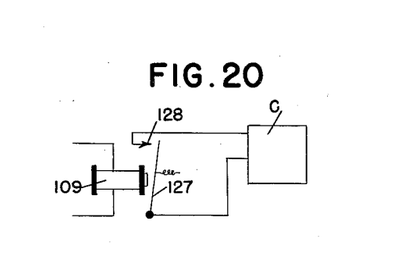

Some electric control circuits operate through an auxiliary or pilot relay operated by a small electric current which in turn controls a master relay or other form of electromagnet or solenoid requiring larger current, while other circuits will control the master relay or its equivalent by direct connection therewith. As set forth hereinbefore the relays R and 107 are shown as they might be connected for controlling a master relay in the stopping mechanism C, but inasmuch as the timer and detecting switches are capable of carrying appreciable currents they can be in direct circuit with the master relay as shown in Figs. 19 and 20. It is to be understood that these figures are similar, respectively, to corresponding parts of Figs. 5 and 16.

In Fig. 19 the relay R has been replaced by a master relay RM and the armature 125 is normally spaced from a contact 126 which may if desired be of the multiple form. So long as relay RM is maintained energized the circuit to the stopping mechanism C will be open, but as soon as current fails because of slow running of the shuttle relay RM will become deenergized and the armature 125 will engage contact 126, whereupon stopping mechanism in the control box or panel C will act to stop the loom.

In Fig. 20, which corresponds to the form of the invention in which the relay or electromagnetic device is normally deenergized, the relay 107 of Fig. 16 is replaced by relay 109, which is of the master type. Armature 127 will normally be held spaced from a contact 128 so that the stopping circuits within the control panel C will be dead. When relay 109 is energized armature 127 will engage contact 128, whereupon the control panel C will effect prompt stoppage of the loom.

It is to be understood that the electromagnetic device referred to herein as controlling the mechanism C can be either a pilot relay, such as relay R, or it can be a master relay, such as relay RM. The time intervals available for stopping the loom in the event of protection are very small, representing only a minor fraction of a second, and where higher loom speeds are desired, these fractions will become proportionately smaller and it may be desirable to save the time required for the pilot relay to drop out, in which event it may be preferred to use the master relays or similar electromagnetic devices shown in Figs. 19 and 20.

In the forms of the invention wherein the timer switch and one or more detector switches are in parallel circuits controlling the electromagnetic device, such as the relay R, it is desirable to time the opening of the timer switch so that its interval of opening will start slightly after the period during which the detecting switch is closed and will end slightly before the termination of the period of closure of the detector switch. In this way the circuit through the relay will not be interrupted and sparking will be avoided.

From the foregoing it will be seen that the invention sets forth simple means by which a shuttle when running properly reaches a given point along the lay at a given time in the loom cycle and operates a detecting switch in time to maintain unchanged the condition of energization of an electromagnetic device which controls loom operation. If the shuttle should be running slow, however, it will not be able to operate the detector switch in time to prevent a change in the condition of the relay or the like, and under these conditions the controller mechanism C effects immediate stoppage of the loom. In the variation of the preferred form the two switches located in a single detecting zone near the longitudinal center of the lay are close enough together so that the first to be closed by a passing shuttle will remain closed until the other is closed by the shuttle, thereby providing a longer detecting period than is possible in the circuit shown, for instance, in Fig. 5. In the first and second modified forms the detecting zones are located near the sides of the warp shed, a condition which enables the shuttle to give indication at a time in its flight later than is possible in the preferred form. In the preferred and first modified form the operator rods which control the detector switches are held raised by springs which are sufficiently strong to withstand the downward force exerted by the small group of warp threads in the bottom shed which engage the operator, but in the second modified form this relationship is not necessary. In all forms of the invention the detector switch operators are acted upon by forces derived from the shuttle, one of these forces at least being due to the weight of the shuttle. The circuit means controlling the electromagnetic device, such as relay R or 107, includes a detecting switch moved by an operator normally projecting into the path of the shuttle. When parallel circuits are used for the timer and detecting switches the detector switch is preferably closed for a period starting slightly before and continuing after the interval in which the timer switch is open to avoid sparking at the switch contacts. Also, the detector switch operators when located near the warp selvages are operated in succession by the shuttle and independently of each other and the shuttle is required to depress only one of the operators 61 at a time.

Having thus described the invention it will be seen that changes and modifications of the foregoing specific disclosure may be made without departing from the spirit and scope of the invention.

What is claimed as new is:

1. In protection means for a loom having a shuttle which when running properly passes a given point along the lay between the selvage warps at a given time in the loom cycle, a movable electric switch operator located at said given point normally extending into the path of the shuttle and moved by the latter when the shuttle passes the operator, an electric switch capable of being in either open or closed condition thereof and normally in one of said conditions and moved to the other condition when the operator is moved by the shuttle, electric circuit means including an electromagnetic device and said switch, and loom stopping means controlled by said electromagnetic device effective to stop the loom upon failure of the shuttle to move said operator and cause said switch to be in said other condition thereof at said given time in the cycle of the loom.

2. In protection means for a loom having a shuttle which when in flight traverses a path along the lay and when running properly passes a given point along the lay at a given time in the loom cycle, a movable electric switch operator under said path of the shuttle located at said given point normally extending upwardly into said path and depressed by the shuttle when the latter passes over the operator, an electric switch capable of being in either open or closed condition and normally in one of said conditions and being moved to the other condition thereof when the operator is depressed by the shuttle, electric circuit means including an electromagnetic device and said electric switch, and loom stopping means controlled by said electromagnetic device effective to stop the loom upon failure of the shuttle to depress said operator and cause said electric switch to be in said other condition thereof at said given time in the loom cycle.

3. In protection means for a loom having a shuttle which when in flight traverses a path along the lay and when running properly passes a given point along the lay between the selvage warps at a given time in the loom cycle, a movable electric switch operator under said path of the shuttle located at said given point normally extending upwardly into said path and engaging certain of the warp threads and depressed by the shuttle when the latter passes over the operator, said operator normally capable of withstanding the downward force exerted by warp threads in engagement therewith, an electric switch capable of being in either open or closed condition and normally in one of said conditions and being moved to the other condition thereof by said operator when the latter is depressed by the shuttle, electric circuit means including an electromagnetic device and said switch, and loom stopping means controlled by said electromagnetic device effective to stop the loom upon failure of the shuttle to depress said operator at said given time in the loom cycle.

4. In protecting means for a loom having a lay along which a shuttle when running properly passes a given point on the lay under the warp threads at a given time in the loom cycle, a normally open electric switch on the under side of the lay, a switch operator supported by the switch extending upwardly therefrom through the lay and engaging certain of the warp threads and into the path of the shuttle, the latter when passing over the operator effective to depress the latter to close said switch, said switch normally effective to maintain the operator in the path of the shuttle against the downward force exerted by the warp threads engaging the operator, electric circuit means including an electromagnetic device and said switch, and loom stopping means controlled by said device effective to stop the loom on failure of the shuttle to depress said operator and close said switch at said given time in the loom cycle.

5. In protection means for a loom having a shuttle which when in flight traverses a path along the lay and when running properly passes a given point along the lay between the selvage warps at a given time in the loom cycle, a movable electric switch operator under said path of the shuttle located at said given point normally extending upwardly into said path of the shuttle and depressed by the latter when the shuttle passes over the operator, the latter normally capable of withstanding the downward force exerted thereon by the warp threads, an electric switch capable of being in either open or closed condition and normally in one of said conditions and being in the other condition thereof when the operator is depressed by the shuttle, electric circuit means including an electromagnetic device and said switch, and loom stopping means controlled by said electromagnetic device effective to stop the loom upon failure of the shuttle to depress said operator at said given time in the loom cycle.

6. In protection means for a loom having a shuttle which when running properly passes a given point along the lay between the selvage warps at a given time in the loom cycle, a movable electric switch operator located at said given point normally extending into the path of the shuttle and moved by the latter when the shuttle passes the operator, a normally open electric switch closed when said operator is moved by the shuttle, electric circuit means including an electromagnetic device and said switch, and loom stopping means controlled by said electromagnetic device effective to stop the loom upon failure of the shuttle to move said operator at said given time in the loom cycle.

7. In protection means for a loom having a shuttle which when in flight traverses a path along the lay and when running properly passes a given point along the lay at a given time in the loom cycle, a movable electric switch operator under said path of the shuttle located at said given point normally extending upwardly into said path of the shuttle and depressed by the latter when the shuttle passes over and engages the operator, a normally open electric switch closed by said operator when the latter is depressed by the shuttle, electric circuit means including an electromagnetic device and said switch, and loom stopping means controlled by said electromagnetic device effective to stop the loom upon failure of the shuttle to depress said operator at said given time in the loom cycle.

8. In protection means for a loom having a shuttle which when in flight traverses a path along the lay and when running properly passes through a shuttle position detecting zone on the lay intermediate the warp selvage threads at a given time in the loom cycle, switch operating means in said zone under the warp threads depressed by the shuttle when the latter passes through said zone, an electric switch normally open but closed when the shuttle depresses said operating means, electric circuit means including an electromagnetic device and said switch, and loom stopping means controlled by said electromagnetic device effective to stop the loom upon failure of the shuttle to move said operating means at said given time in the loom cycle.

9. In protection means for a loom having a shuttle which when in flight traverses a path along the lay and when running properly passes through a shuttle position detecting zone on the lay at a given time in the loom cycle, operating means in said zone moved by the shuttle when the latter passes through said zone, said operating means including two elements spaced apart along the lay a distance less than the length of the shuttle, electric switch means capable of being in open or closed condition and normally in one condition but moved to the other condition when the shuttle moves said operating means, electric circuit means including an electromagnetic device and said switch means, and loom stopping means controlled by said electromagnetic device effective to stop the loom upon failure of the shuttle to move said operating means at said given time in the loom cycle.

10. In protecting means for a loom having a lay along which a shuttle when running properly passes a given point on the lay at a given time in the loom cycle, an electric switch on the under side of the lay capable of being in either open or closed condition and normally in one of said conditions, but movable to the other condition thereof, a switch operator supported by the switch extending upwardly therefrom through the lay and into the path of the shuttle, the latter when passing over the operator effective to depress the latter to move the switch to said other condition thereof, electric circuit means including an electromagnetic device and said switch, and loom stopping means controlled by said device effective to stop the loom on failure of the shuttle to depress said operator at said given time in the loom cycle.

11. In protector mechanism for a loom having a lay along which a shuttle travels, the shuttle when running properly passing through a shuttle position detecting zone located along the lay at a given time in the loom cycle, a normally open electric switch mounted on the under side of the lay, an operator extending upwardly through the lay and supported by the switch in such manner that the upper end of said operator is normally in the path of the shuttle in said zone, the shuttle when passing over the operator depressing the latter to close the switch, electric circuit means including the switch and an electromagnetic device, and loom stopping means controlled by the device effective to stop the loom if the shuttle fails to depress said operator at said time in the loom cycle.

12. In protection means for a loom having a lay along which the shuttle travels, the shuttle when running properly passing over a given point along the lay at a given time in the loom cycle, support means secured to the under side of the lay, an electric switch mounted on said support means, a switch operator supported by the switch and extending upwardly therefrom, said switch being normally open and supporting the operator in such manner that the upper end thereof normally extends into the path of the shuttle at said point, the shuttle when passing said point depressing the operator and closing said switch, electric circuit means including said switch and an electromagnetic device, and loom stopping means controlled by the device effective to stop the loom upon failure of the shuttle to depress said operator and close the switch at said time in the cycle of the loom.

13. In protection means for a loom having a lay along which a shuttle travels, the shuttle when running properly passing over a given point along the lay at a given time in the loom cycle, support means on the under side of the lay, an electric switch mounted on said support means, a switch operator supported by the switch and extending upwardly through the lay, said switch normally being open and supporting the operator in such manner that the upper end thereof extends into the path of the shuttle at said point, the shuttle when passing said point depressing the operator and closing said switch, electric circuit means including said switch and an electromagnetic device, loom stopping means controlled by the device effective to stop the loom upon failure of the shuttle to depress said operator and close the switch at said time in the cycle of the loom, and means by which the vertical position of the switch and operator can be adjusted relatively to the lay to vary the extent by which the upper end of the operator extends into the path of the shuttle.

14. In protecting means for a loom having a lay along which a shuttle moves, the shuttle when running properly passing a given point along the lay at a given time in the loom cycle, a normally open electric switch mounted on the under side of the lay, the latter having a bore extending upwardly therethrough over the switch, an operator for the switch slidable vertically in said bore and supported by the switch in such manner that the upper end of the operator extends into the path of the shuttle, electric circuit means including the switch and an electromagnetic device, and loom stopping means controlled by the device effective to stop the loom upon failure of the shuttle to depress said operator and close said switch at said given time in the loom cycle.

15. In protection means for a loom having a lay along which a shuttle travels, the shuttle when running correctly during a flight thereof passing through a detecting zone along the lay at a given time in the loom cycle, a normally closed loom operated timer switch which opens momentarily at said time in the loom cycle and then closes during continued flight of the shuttle, a normally open electric detecting switch, an operator in said zone moved by the shuttle as the latter passes through said zone to close said detecting switch, the latter thereafter opening during continued flight of the shuttle, said shuttle when running correctly closing the detecting switch during the time the timer switch is open and the timer switch then closing as the detecting switch opens during flight of the shuttle, and electric means controlled by the timer and detecting switches effective to stop the loom upon failure of the shuttle to pass through said detecting zone at said time in the loom cycle when the timer switch is open.

16. In protection means for a loom having a shuttle moving along a lay, the shuttle when running properly during a flight thereof passing a given point along the lay at a given time in the loom cycle, a loom operated normally closed electric timer switch which opens for a brief interval at said given time in the loom cycle and then closes during continued flight of the shuttle, a normally open electric detecting switch, means operated by the shuttle when passing said point effective to close said detecting switch, the latter thereafter opening during continued flight of the shuttle, loom controlling electric circuit means including an electromagnetic device and two parallel electric circuits, one circuit for said timer switch and the other circuit for said detecting switch, and loom stopping means controlled by the device effective to stop the loom upon failure of the shuttle to effect closure of the detector switch during said interval, the shuttle when running properly effecting closure of the detector switch prior to the start of said interval and maintaining the detector switch closed after said interval.

17. In protection means for a loom having a lay provided with two detecting zones and along which a shuttle when traveling in one direction passes first through one zone and then the other zone, the shuttle when traveling in the opposite direction passing first through the other zone and then said one zone, the shuttle when running correctly on any flight passing through the second of the zones through which it passes at a given time in the loom cycle, a normally closed loom controlled timer electric switch opening for a brief interval at said given time in the loom cycle and then closing after said interval during continued flight of the shuttle, a normally open electric detecting switch for each zone, operating means for each detecting switch by which the latter is closed when the shuttle passes through the corresponding zone, the detecting switch then opening during continued flight of the shuttle, electric circuit means including an electromagnetic device and said timer and detector switches connected in parallel, and stopping means controlled by the electromagnetic device effective to stop the loom upon failure of the shuttle to cause closing of the detecting switch corresponding to the second of the zones through which the shuttle passes at said time in the loom cycle when the timer switch is open.

18. In protection means for a loom having a lay provided with a shuttle which moves along the lay, the shuttle having a vertical wall and when operating correctly causing said wall to pass over a given point on the lay at a given time in the loom cycle, a normally open electric switch, an operator for the switch movable vertically with respect to the lay and having the upper end thereof extending into the path of the shuttle at said point, electric circuit means including said switch and an electromagnetic device, and stopping means effective to stop the loom upon failure of the shuttle to cause said wall to pass over said operator and depress the latter and close said switch at said given time in the loom cycle.

19. In protection means for a loom having a lay along which a shuttle travels, the shuttle when running properly passing a given point on the lay at a given time in the loom cycle, loom stopping means, an electromagnetic device effective upon a change in the condition of energization thereof to cause the stopping means to stop the loom, a timer switch moved by the loom, a detecting switch operated by downwardly directed forces derived in part at least from the weight of the shuttle when the latter reaches said point along the lay, and electric circuit means including said switches and device effective when the shuttle reaches said point along the lay at said time in the loom cycle to maintain unchanged the condition of energization of the electromagnetic device but effective to change the condition of energization of said device upon failure of the shuttle to reach said point along the lay at said time in the loom cycle.

20. In protection means for a loom having a lay along which a shuttle travels, the shuttle when running correctly passing through a detecting zone along the lay at a given time in the loom cycle, a normally open loom operating timer switch which closes momentarily at said time in the loom cycle, a normally closed electric detecting switch, an operator in said zone moved by the shuttle as the latter passes through the zone to open said detecting switch, said shuttle when running correctly opening the detecting switch during the time the timer switch is closed, electric means controlled by the timer and detecting switches and including an electromagnetic device normally deenergized, and stopping means controlled by the electromagnetic device effective to stop the loom upon failure of the shuttle to pass through said detecting zone at said time in the loom cycle and open said detecting switch when the timer switch is closed.

21. In protecting means for a loom having a shuttle moving along the lay, the shuttle when running properly passing a given point along the lay at a given time in the loom cycle, a loom operated timer switch normally open but closing at said given time, a normally closed electric detecting switch, means operated by the shuttle when passing said point effective to open said detecting switch, an electromagnetic device, stopping means controlled by the device, and a series electric circuit including said timer switch and detecting switch and device, the latter being normally deenergized, the shuttle when passing said point at said given time opening the detecting switch to prevent closure of said series circuit by the timer switch, and said series circuit upon failure of the shuttle to arrive at said point at said given time being closed to energize the device, whereupon said stopping means effects loom stoppage.

22. In protection means for a loom having a shuttle which when running properly passes a given point along the lay at a given time in the loom cycle, a movable electric switch operator located at said given point normally extending into the path of the shuttle and moved by the latter when the shuttle passes said point, an electric detecting switch on the lay normally closed but opened by said operator when the latter is moved by the shuttle, electric circuit means including an electromagnetic device and said switch, said electromagnetic device being normally deenergized, and loom stopping means controlled by the electromagnetic device effective to stop the loom upon failure of the shuttle to move said operator and open said detecting switch at said given time in the cycle of the loom.

23. In loom protection means for a loom having a lay along which a shuttle travels, the shuttle when running properly during a flight thereof passing a given point on the lay at a given time in the loom cycle, stopping means for the loom, an electromagnetic device controlling the stopping means and effective upon a change in the condition of energization thereof to cause operation of the stopping means, and electric circuit means including the electromagnetic device and a timer electric switch controlled by the loom to open and then close during flight of the shuttle and a detecting electric switch controlled by the shuttle to be closed by the latter when the shuttle reaches said point along the lay and then open after the shuttle passes said point during continued flight of the shuttle, said circuit means effective to maintain unchanged the condition of energization of said electromagnetic device if the shuttle reaches said point at said time in the loom cycle but effective to cause a change in the condition of energization of the electromagnetic device upon failure of the shuttle to reach said point at said time in the loom cycle or upon failure of said timer switch to be closed upon opening of the detecting switch during continued flight of the shuttle.

24. In protection means for a loom having a shuttle which when running properly during a flight thereof passes a given point along the lay at a given time in the loom cycle, a loom operated timer switch which is normally closed but opens when the shuttle if running properly reaches said given point and thereafter closes during continued flight of the shuttle, a shuttle operated detecting switch normally open but closed by the shuttle when the latter reaches said given point and thereafter opens as the shuttle continues in its flight after passing said given point, and electric means controlled by the timer and detecting switches effective to stop the loom upon failure of the shuttle to pass said given point at said given time in the loom cycle or upon failure of the timer switch to be closed during continued flight of the shuttle when said detecting switch opens after the shuttle passes said given point.

CHARLES W. MOSS.
WILLIAM A. BLANCHARD.

REFERENCES CITED

The following references are of record in the file of this patent:

UNITED STATES PATENTS

| Number | Name | Date |
|---|---|---|
| 905,131 | Bacon | Dec. 1, 1908 |
| 1,620,836 | Schmiege | Mar. 15, 1927 |
| 1,790,335 | Weissenborn | Jan. 27, 1931 |
| 1,812,206 | Hindle et al. | June 30, 1931 |
| 1,950,224 | Burdett | Mar. 6, 1934 |
| 2,179,338 | Lindegren | Nov. 7, 1939 |
| 2,499,887 | Sullivan et al. | Mar. 7, 1950 |

FOREIGN PATENTS

| Number | Country | Date |
|---|---|---|
| 59,709 | Germany | Nov. 10, 1891 |
| 97,544 | Germany | June 9, 1898 |